March 31, 1942.    L. ILLMER    2,277,665

AUTOMOTIVE MILEAGE REMINDER OF THE DRUM TYPE

Filed June 8, 1940

INVENTOR.
Louis Illmer.

Patented Mar. 31, 1942

2,277,665

UNITED STATES PATENT OFFICE 2,277,665

AUTOMOTIVE MILEAGE REMINDER OF THE DRUM TYPE

Louis Illmer, Cortland, N. Y.

Application June 8, 1940, Serial No. 339,536

2 Claims. (Cl. 40—68)

This invention pertains to a handy accessory for automobile and truck drivers undertaking distant tours along unfamiliar routes, and is more especially directed to compact recorder means attached to a steering gear constituent and provided with one or more rotary drums respectively having numerals or other indicia thereon intended to be hand set en route in advance of the prevailing recorded trip meter or mileage totalizer reading, said drums being preset in accordance with the distance stipulated on a scrutinized cross road sign or the like highway instructions whereby at a glance to keep clearly in mind the measured travel distance that is still to be driven prior to reaching a desired destination or the making of a contemplated vehicle turn at a particular road intersection.

When the metered mileage advances to the set reading of my reminder device, the point of destination will have been definitely fixed without uncertainty in orientation or vexation on part of the motorist. Such commitment device may be sustained either by the steering wheel or its post within the line of vision and convenient manipulative reach of the driver. Because of its conspicuous script space, my car adjunct may also effectively serve as an inexpensive advertising novelty or as a premium article for sales promotion projects.

The object of my improvements is to devise an inherently simple and compact mechanism of the indicated character without the need of any intermeshed drive gearing of the odometer type and of which its principal components may be economically fabricated at a sufficiently low cost basis to be profitably sold in quantity through mail order houses, chain stores and the like large scale distributors, or be handled as an advertising novelty or by premium houses.

Also embodied herein are certain associated structural aspects designed to achieve the end in view, all of which will hereinafter be more explicitly set forth. Reference is had to the accompanying one sheet of drawings that are illustrative of a preferred embodiment of my invention, and in which drawing:

Fig. 3 represents an elevational end view of Fig. 2, while

Figure 5:
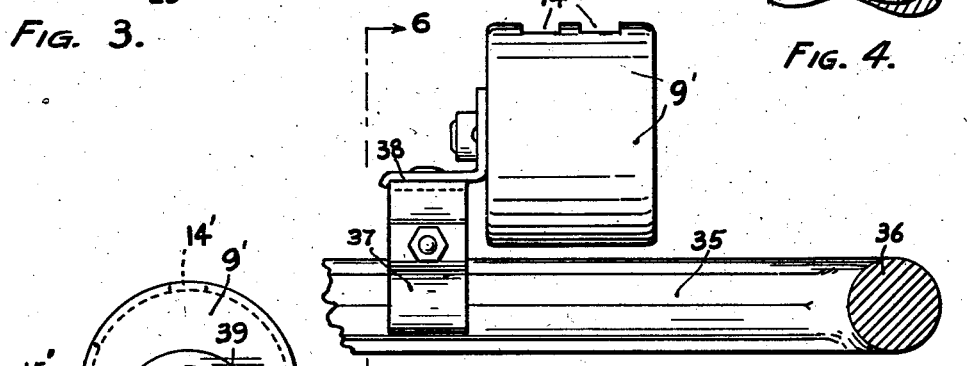
Figure 6:
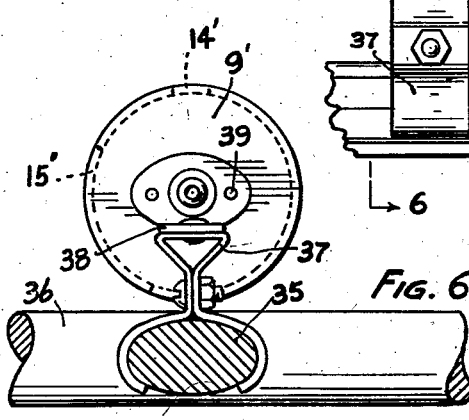

Fig. 5 schematically shows my device applied to a steering wheel spoke, and Fig. 6 is an end view thereof taken along 6—6 of Fig. 5.

Referring in detail to these disclosures, my device is of diametrically small size and as such may comprise an incomplete cup shaped casing or drum housing 9. While this mounting element may be die cast as a metal product, it is expressly designed to be moulded from suitable plastic material to comprise a transverse head 10 (see Fig. 2) of which the central region may be shaped to provide for an apertured hub 11. Said head plate component may be equipped with an integral cylindrical or the like tubular skirt component 12 having one or more aligned sight holes or windows therethrough such as 14. An open mouthed skirt portion may be cut away to constitute a finger receiving access gap 15 of arcuate contour that is perimetrically offset and purposely kept separated from a sight hole. Said gap is arranged to open alongside the head 10 to afford a long sweep manipulative drum range designated A (see Figs. 3 and 4). Such sight hole is preferably located in an opposed relation to the arcuate gap length within the driver's line of vision.

A metallic stanchion or the like bearing 16 may have a shouldered end tightly entered into the axially centralized hub aperture to overhangingly project inwardly of my skirt component. Said affixed stanchion end may be countersunk at 13 and expanded in place as a tubular rivet. Independently mounted upon said stanchion for centralized rotation within the skirt confines, are a plurality of reversed manipulative drums that may respectively be plastic moulded to comprise a hubbed disc 19. Each outstanding peripheral drum ridge 20 may be knurled and reversely disposed in tandem to provide for adequate finger clearance as shown. Such drums may respectively include a cylindrical rim flange portion 21 that is concentrically inset with respect to its cooperating ridge. The diametral size of this ridge is sufficiently small and so arranged as to wholly fall within the interior bore confines of the housing 9, it being the intent to reach a finger through my comparatively large access gap in order to manipulate the drum ridges. The exterior face of each rim flange may have a series of digits such as 22 or the like indicia impressed or raised thereon to lie alongside an adjacent ridge 20 (see Fig. 4). To facilitate manufacture, such notation is preferably applied in the form of separately printed strip material or affixed band 23 (see Fig. 2).

Each drum may additionally be provided with a bored hub and with an opposed tubular hub extension or integral spacer tit such as 24. Said hubs may be mounted in axial tandem relation on the stanchion 16, whereupon the pin counterbore 13' may be flared to take up end play in collarlike fashion but permit independent drum rotation. The several drum discs 19 may respectively be provided with a series of centering holes or equivalent superficial sockets 26 that are uniformly spaced about the pin axis in radial registry with the respective digits 22.

When a drum is manually rotated, its digits are intended to successively fall into registry with the sight hole thereof. The skirt gap 15 is arranged to give the driver unobstructed finger access to each disc perimeter 20 for mileage setting needs and which gap disposition represents a noteworthy feature of my device. In order to feel when such registry is achieved and to retain a preset drum against inadvertent displacement, I further provide for frictional drag means. To this end, a relatively long retaining clip 27 may be stamped from metallic spring stock or the like and have one end riveted or spot welded to the skirt interior. The other clip end may be equipped with a spherical nub 28 shaped to nicely drop into registry with a disc socket when a corresponding digit becomes centered beneath its associated sight hole. As shown, said clip may be crooked to clear its contiguous tit 24.

Figure 1:
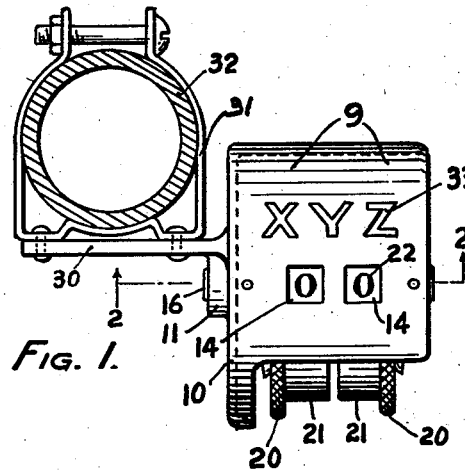
Fig. 1 shows an exterior top view of such reminder device bracketed to a steering post.
Figure 2:
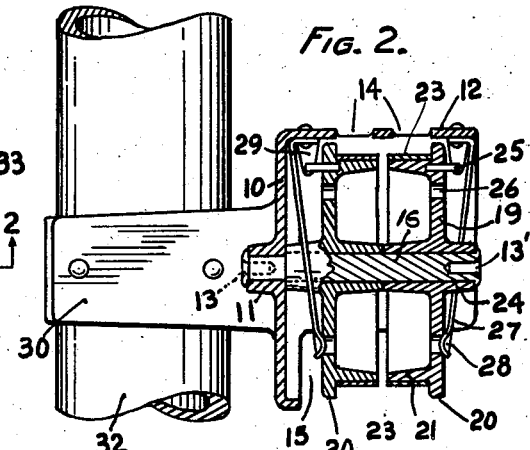
Fig. 2 is a cross-sectional view taken along 2—2 of Fig. 1.
Figure 3:
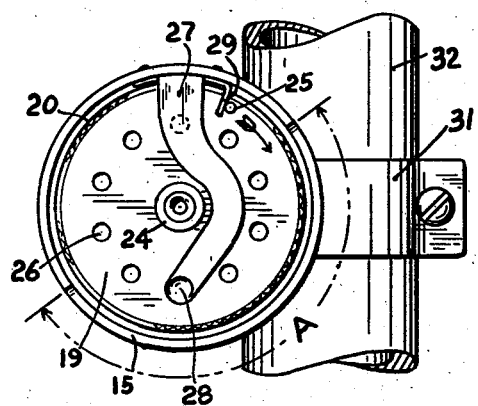
Figure 4:
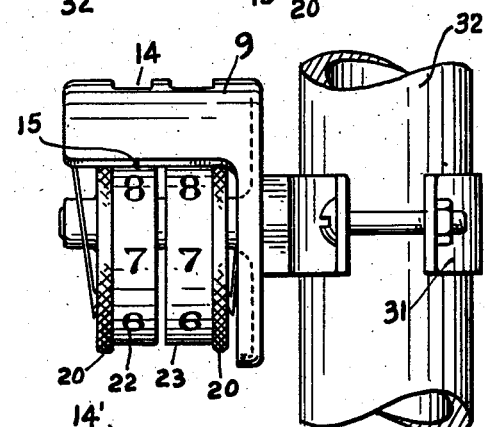
Fig. 4 depicts an elevational rear side view of Fig. 1.

When my reminder is not in active service, the drum digits 22 are intended to be manipulated into their respective zero settings as in Fig. 1. In order to readily locate such reference position, each drum disc 19 may have an overhanging stop pin 25 disposed to abut a depending lip 29 carried by the clip flange as indicated in Figs. 2 and 3. The cited fixed stop device allows all digits in the dark of night to be brought into an assured zero position and then by feel to be advanced into any desired preset position.

As described in detail, said housing may be utilized as a hand gripped device, but it is preferred to further provide the same with appropriate supporting means for present needs that may be economically fabricated on a rapid productive basis. In Fig. 1, the head plate 10 carries an outstanding supporting bracket or appended prong 30 that is shown as formed integrally. The yoke of a U-shaped post clamp 31 of metallic strip stock may be affixed to one side face of my prong in an embracing relation to a conventional steering post 32. Such disposition places the sight holes 14 in line of the driver's vision but substantially conceals the wide access gap so as not to interfere with any set digit readings. If desired, the upturned casing surface may be provided with advertising script such as 33, thus making for a conspicuous display.

Figs. 5 and 6 reveal a slightly modified reminder device 9' that is compactly attached to the spoke 35 of the steering wheel rim 36 by an affixed clasp 37. In addition, the stamped universal bracket or supporting prong 38 may be separately formed from the casing head and riveted thereto as at 39. In either form of attachment, said prong lies substantially parallel to the stanchion axis and requires but a few moments to operatively apply my remainder to any standard passenger car or truck.

The function of my commitment means will it is believed, be evident from its structural definition. Having reached a highway sign revealing the distance to a reasonably close destination, the driver manipulatively sets a particular mileage reading in registry with the sight holes 14 in advance of the prevailing last two significant numerals appearing on the car meter reading. Such preset distance when overtaken by the meter, unconfusedly denotes arrival in the vicinity where a proper road turn or other route transition should be made. In the absence of a separate trip meter, my commitment device may also be utilized in trip meter fashion to identify the starting mileage appearing on the totalizer dial. The present register is primarily designed to ease the driver's mind during a long tour and allow him to concentrate on careful car operation with the assurance that certain material road instructions are not likely to be neglected.

A single drum may likewise be resorted to having sufficient numerals thereon to read directly beyond the digit 9 which provision is sufficient to satisfy present needs where a comparatively short prospective distance is to be committed. My duplex or reserve drum extends the recordable distance up to 99, a limit that is not compactly attainable with a single drum of the requisite small diametral size.

It is thought the foregoing disclosure will make apparent to those skilled in this art, the inherent advantages of my compact remainder device, it being understood that the frictional drag expedients may be eliminated or otherwise effected by equivalent means, also that various other structural changes in the foregoing illustrative embodiment may be resorted to, all without departing from the spirit and scope of my invention.

I claim:

1. An automotive mileage reminder adapted to be operatively carried within the driver's reach by a steering gear constituent and which reminder is provided with a cup-shaped housing comprising a cylindrically incomplete skirt component and a transverse head component, the skirt perimeter having a single arcuate finger-receiving access gap therethrough of which a marginal region opens alongside said head and further having a separated sight hole located in a substantially opposed relation to the arcuate length of said gap within the driver's line of vision, a centralized stanchion overhangingly erected upon said head to project axially into the skirt interior, and a manipulative drum rotatably mounted upon said stanchion and the diametral size of which drum is kept smaller than the skirt bore and wholly confined therein, the perimeter of said drum having a series of digits disposed therealong of which certain digits remain masked behind a completed skirt portion to selectively shift into visible registry with said sight hole when the drum is rotated by entering a finger through said access gap and which gap is kept substantially concealed from interfering visional perception of the driver.

2. An automotive mileage reminder adapted to be operatively carried within the driver's reach by a steering gear constituent and which reminder is provided with a cup-shaped housing comprising a cylindrically incomplete skirt component and a transverse head component, the skirt perimeter having an arcuate finger-receiving access gap therethrough of which a marginal region opens alongside said head and further having a separated sight hole located in a substantially opposed relation to the arcuate length of said gap within the driver's line of vision, a centralized stanchion overhangingly erected upon said head to project axially into the skirt interior, a manipulative drum rotatably mounted upon said stanchion to include a peripheral ridge wholly confined within said skirt interior in laterally spaced adjacency to the housing head, the perimeter of said drum having a series of digits thereon of which certain digits remain masked behind a completed skirt portion to selectively shift into visible registry with said sight hole, and a resilient clip imposed between said spaced drum ridge and the housing head with one clip portion fixedly secured to said housing and a free clip portion disposed to releasably retain the drum in different set positions when rotatably fingered through said access gap.

LOUIS ILLMER.